C. E. FORRY.
DOUBLE SEAMING MACHINE.
APPLICATION FILED JULY 26, 1909.

1,042,211.

Patented Oct. 22, 1912
10 SHEETS—SHEET 1.

Fig. 1

WITNESSES:
N. D. Keating
F. C. Fliedner

INVENTOR
C. E. Forry,
BY
F. M. Wright
ATTORNEY.

C. E. FORRY.
DOUBLE SEAMING MACHINE.
APPLICATION FILED JULY 26, 1909.

1,042,211.

Patented Oct. 22, 1912.
10 SHEETS—SHEET 3.

WITNESSES:
N. B. Keating
F. C. Fliedner

INVENTOR,
C. E. Forry
BY
F. M. Wright,
ATTORNEY.

C. E. FORRY.
DOUBLE SEAMING MACHINE.
APPLICATION FILED JULY 26, 1909.

1,042,211.

Patented Oct. 22, 1912.
10 SHEETS—SHEET 4.

C. E. FORRY.
DOUBLE SEAMING MACHINE.
APPLICATION FILED JULY 26, 1909.

1,042,211.

Patented Oct. 22, 1912.
10 SHEETS—SHEET 5.

WITNESSES:
N. B. Keating
H. Fliedner INVENTOR
C. E. Forry
BY
F. M. Wright,
ATTORNEY

C. E. FORRY.
DOUBLE SEAMING MACHINE.
APPLICATION FILED JULY 26, 1909.

1,042,211.

Patented Oct. 22, 1912.
10 SHEETS—SHEET 6.

WITNESSES:
N. B. Keating
F. C. Fliedner

INVENTOR
C. E. Forry
BY
F. M. Wright,
ATTORNEY

C. E. FORRY.
DOUBLE SEAMING MACHINE.
APPLICATION FILED JULY 26, 1909.

1,042,211.

Patented Oct. 22, 1912.
10 SHEETS—SHEET 9.

WITNESSES:
N. B. Keating
F. C. Fliedner

INVENTOR
C. E. Forry
BY
F. M. Wright,
ATTORNEY

C. E. FORRY.
DOUBLE SEAMING MACHINE.
APPLICATION FILED JULY 26, 1909.

1,042,211.

Patented Oct. 22, 1912.
10 SHEETS—SHEET 10.

WITNESSES:
N. B. Keating
F. C. Fliedner

INVENTOR
C. E. Forry,
BY
F. M. Wright,
ATTORNEY.

UNITED STATES PATENT OFFICE.

CHARLES E. FORRY, OF OAKLAND, CALIFORNIA, ASSIGNOR, BY MESNE ASSIGNMENTS, TO AMERICAN CAN COMPANY, OF SAN FRANCISCO, CALIFORNIA, A CORPORATION OF NEW JERSEY.

DOUBLE-SEAMING MACHINE.

1,042,211.  Specification of Letters Patent.  Patented Oct. 22, 1912.

Application filed July 26, 1909. Serial No. 509,663.

*To all whom it may concern:*

Be it known that I, CHARLES E. FORRY, a citizen of the United States, residing at Oakland, in the county of Alameda and State of California, have invented new and useful Improvements in Double-Seaming Machines, of which the following is a specification.

The object of the present invention is to provide a rapid and effective machine for supplying tops to can bodies, and for double seaming the same thereon.

The invention resides in the novel construction, combination, and arrangement of parts for the above ends, hereinafter fully specified, and pointed out in the claims.

In the accompanying drawings.

Figure 2:
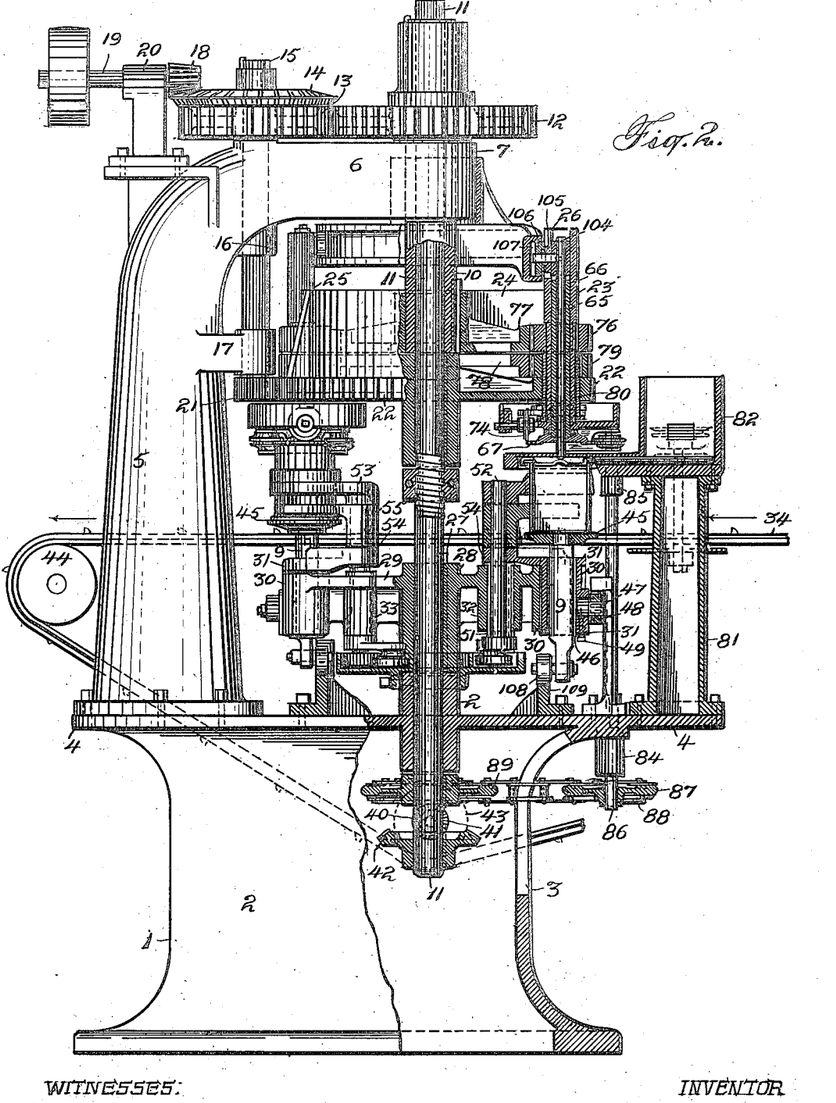
Fig. 2 is a rear view of the same, partly in vertical section.
Figures 19, 20:
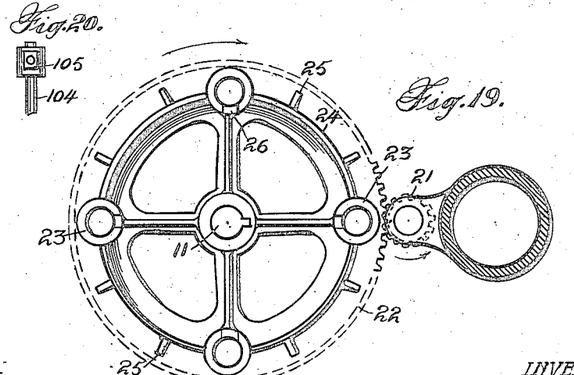
Fig. 19 is a plan view of the spider.
Fig. 20 is a broken front view of the rod operated thereby.
Figure 21:
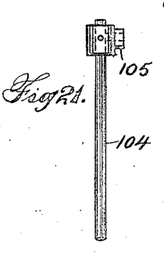
Fig. 21 is a side view of the same.
Figures 22, 24:
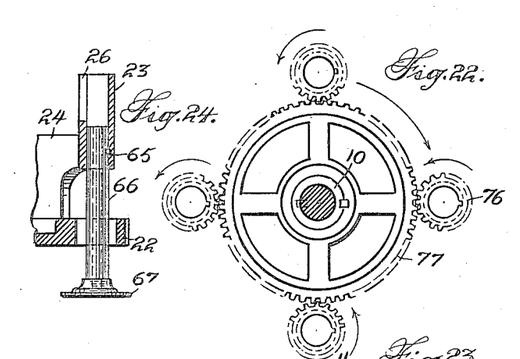
Fig. 22 is a sectional view showing the driving mechanism for the crimping devices.
Fig. 24 is a side view of the chuck, the stem therefor and the support for said stem.
Figures 23, 27, 28, 29:
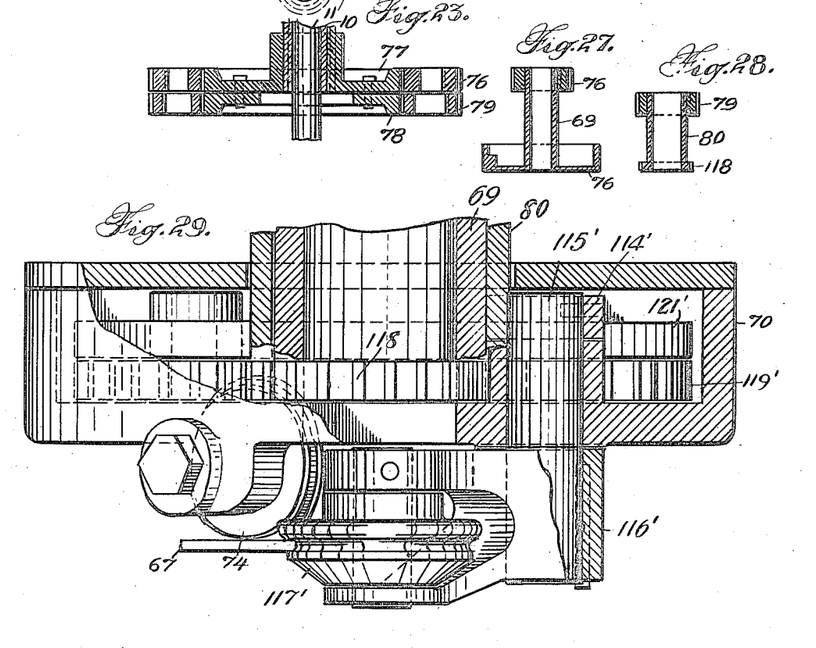
Fig. 23 is a vertical section of the same.
Fig. 27 is a vertical section of the inner tube and head.
Fig. 28 is a similar view of the outer tube.
Fig. 29 is an enlarged sectional view of a portion of the crimper.
Figure 30:
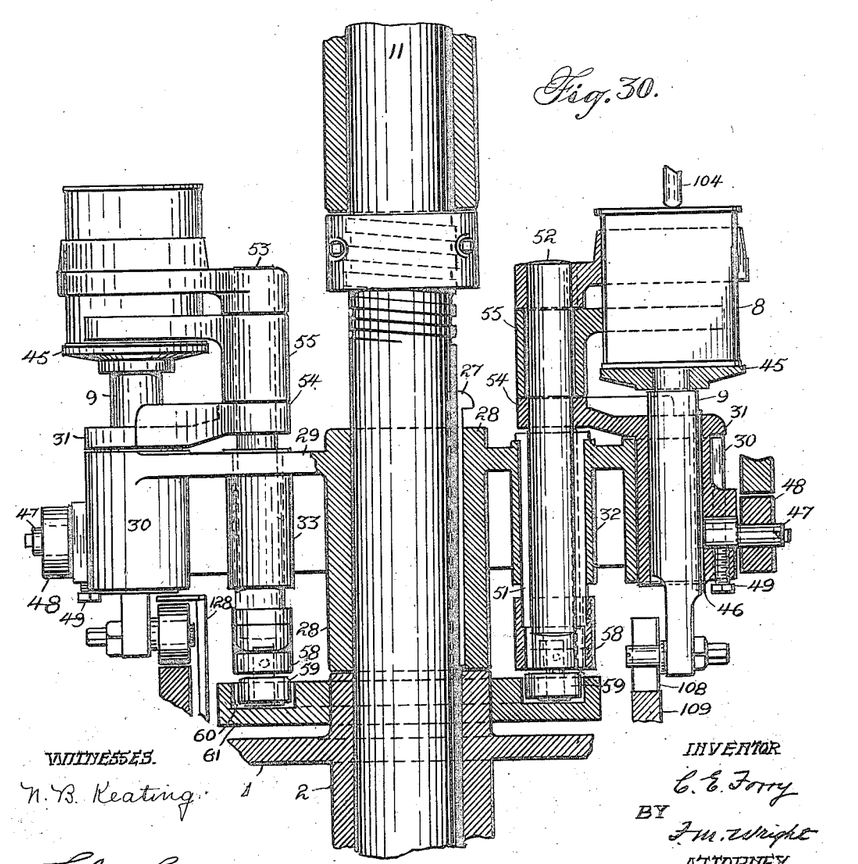
Fig. 30 is an enlarged view, partly in side elevation and partly in vertical section, of the main shaft and two of the carriers.
Figures 31, 32, 33, 34:
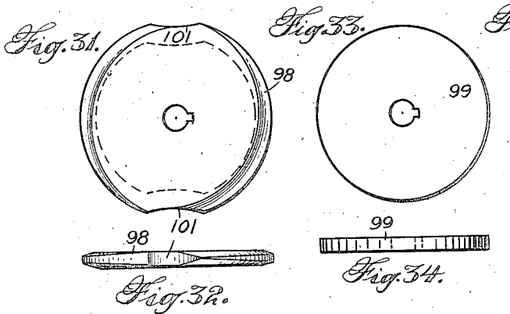
Fig. 31 is a plan view of the upper feed disk.
Fig. 32 is a side view of the same.
Fig. 33 is a plan view of the spacing feed disk.
Fig. 34 is a side view of the same.
Figures 35, 36:
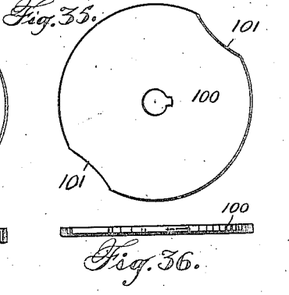
Fig. 35 is the lower feed disk.
Fig. 36 is a side view of the same.

Referring to the drawing, 1 indicates a hollow base, the top of which is formed with a shaft bearing 2, (Fig. 2) and is extended beyond the wall 3 of the base to form a flange 4. Upon said top is secured an upright 5 having an overhanging arm 6, in the end of which is formed an upper shaft bearing 7. In said upper bearing 7 rotates a sleeve 10, within which the upper end of a shaft 11 also rotates, and to said sleeve above said bearing 7 is keyed a gear wheel 12. Said gear wheel 12 meshes with a gear wheel 13 secured to a bevel gear 14 on a vertical counter shaft 15 rotating in bearings 16, 17. Said bevel gear 14 meshes with a bevel pinion 18 upon a horizontal shaft 19 rotating in a bearing 20 on said arm 6, and adapted to be rotated from any suitable source of power. The lower end of said countershaft 15 carries a pinion 21, which meshes with a large gear wheel or upper spider 22 (Figs. 2, 19, 24), fixedly secured to the shaft 11. Said gear wheel or spider 22 is formed with a suitable number, as four, of cylindrical vertical bearings 23, all of which are connected by a circular vertical rib or wall 24, said wall being strengthened by outstanding vertical ribs or buttresses 25. Said upper spider is also formed with upper slide bearings 26 (Figs. 2, 24), in vertical alinement with the several lower bearings 23, said wall being cut away between each upper and lower bearing and to a considerable distance on each side to make room for pinions hereinafter described. To said shaft 11 is also keyed, as shown at 27, the hub 28 of a lower spider 29, (Figs. 2, 9, 30), which is formed with a like number as four, of vertical slide bearings 30 for guiding sleeves 31 (Figs. 2, 12, 30) to receive plungers 9 for supporting the can bodies as hereinafter described. Also corresponding to each slide bearing 30, and between it and its central hub, the lower spider is formed with a pair of bearings 32, 33.

Figure 1:
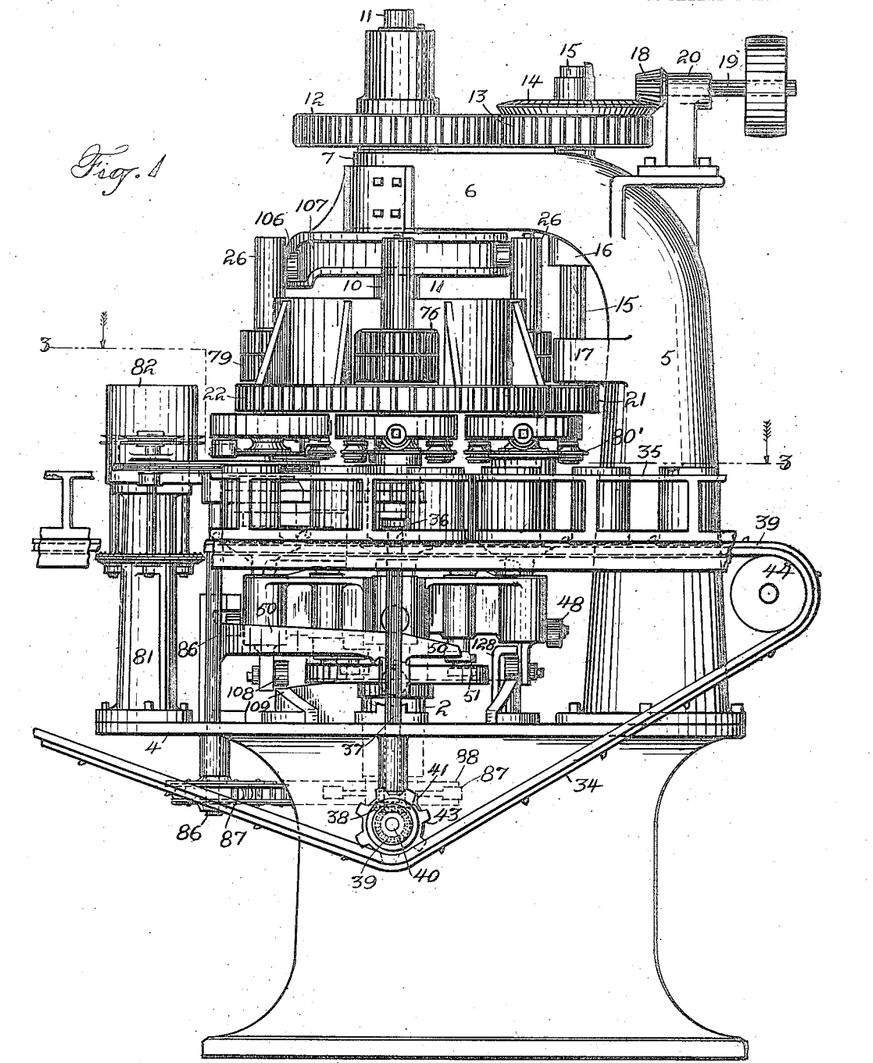
Figure 1 is a front view of the apparatus.
Figures 3, 4, 5, 6:
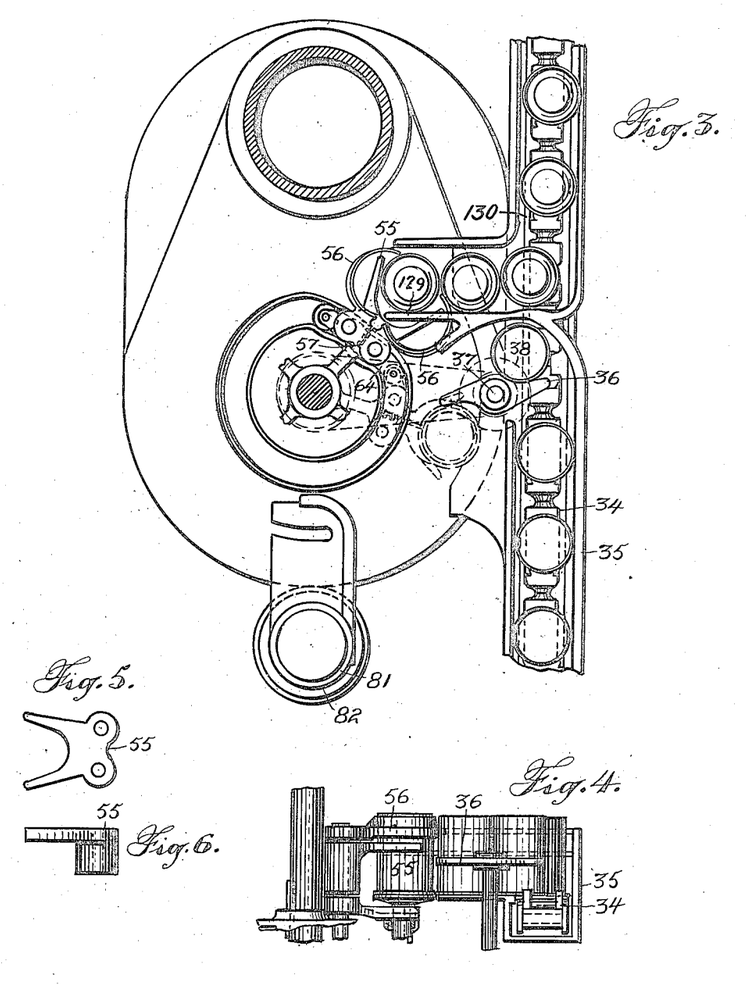
Fig. 3 is a horizontal section on the line 3—3 of Fig. 1.
Fig. 4 is a detail side view of the mechanism for feeding the cans.
Fig. 5 is a plan view of one of the guides.
Fig. 6 is a side view thereof.
Figures 25, 26:
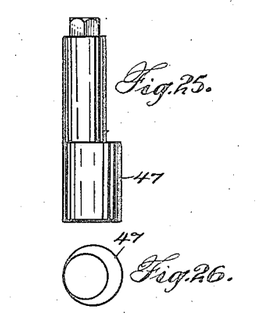
Fig. 25 is a side view of one of the eccentric roller carrying arms.
Fig. 26 is a plan view of the same.

The can bodies are fed to the machine by means of an endless link belt 34 (Figs. 1, 2, 3,) which is located tangentially to the general frame of the machine, (as shown in Fig. 3) and, being continued onward, also serves to remove the cans when the operation is completed. The cans travel on said link belt in a feed guideway 35, the feed end of said guideway 35 being curved inward toward the center of the machine, and each can in turn being positively fed along said guideway to the machine from said link belt by one or the other of two rotating oppositely extending arms 36 mounted upon a vertical shaft 37 driven at the lower end by means of a bevel gear 38 (Figs. 1, 2) meshing with a bevel gear 39 on a horizontal shaft 40 having a bevel gear 41 meshing with a bevel gear 42 on the shaft 11. Said shaft 40 also carries a sprocket wheel 43 which propels the endless belt 34, which passes around suitable idle wheels 44 at the ends of its horizontal path. The can having thus been moved by one of said arms 36 toward the center of the machine is shifted on to one of a number of supporting disks 45 (Figs. 2, 30) severally secured to the plungers 9 each slidable in one of the sleeves 31, which are slidable in the bearings 30 as heretofore described. The plunger 9 is prevented turning in the sleeve 31 by means of a feather 46. At the time the can is fed on to the disk 45, said disk is resting upon the top of said sleeve 31. In a lateral bearing in said sleeve is secured an eccentric inner end of a stud 47 (Figs. 25, 30,) carrying a cam roller 48, said eccentric portion being, for adjustment, rotated in its bearing in said sleeve, and secured by a set screw 49. In the rotation of the lower spider and of the shaft 11, said cam roller 48 runs upon a cam track 50 (Figs. 1, 9) which, at the proper time, raises the sleeve 31 and therefore also the can body 8.

Figure 7:
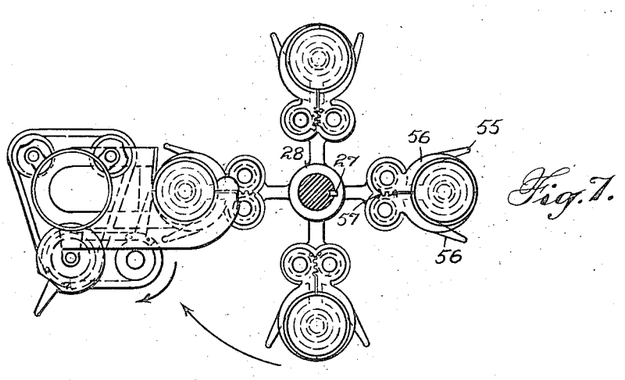
Fig. 7 is a horizontal sectional view on a reduced scale, showing the mechanism for feeding the can tops and also the carrier arms, other parts being omitted.
Figures 9, 10, 11, 12:
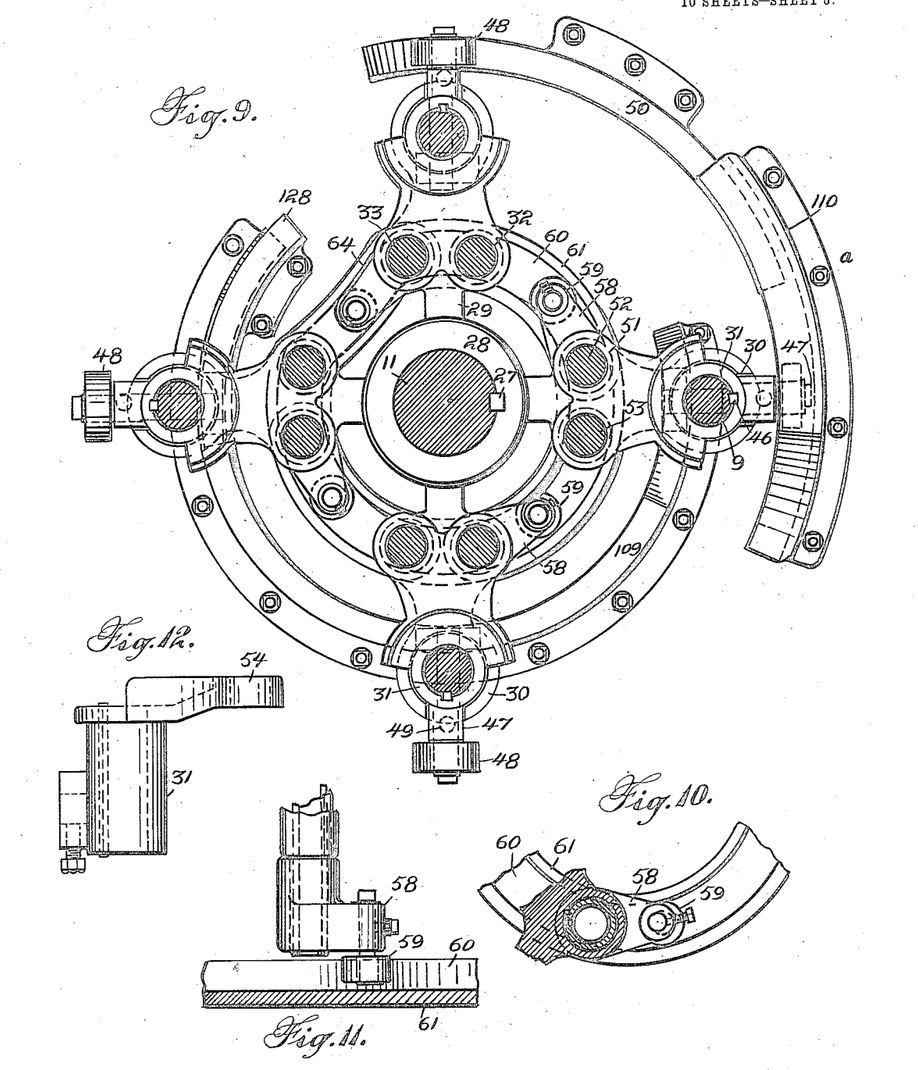
Fig. 9 is a horizontal section on an enlarged scale of the central part of the apparatus.
Fig. 10 is a detail horizontal section through the shaft for operating the clamping finger.
Fig. 11 is a side view of the same.
Fig. 12 is a side view of the upper collar for the same.
Figure 13:
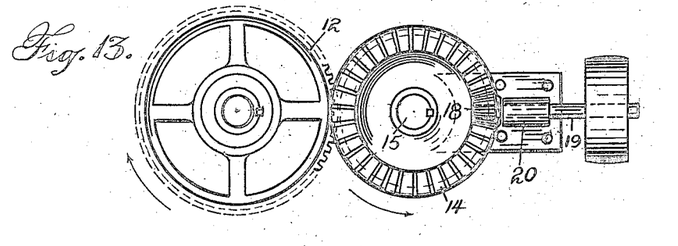
Fig. 13 is a top plan view of the driving gear.
Figure 14:
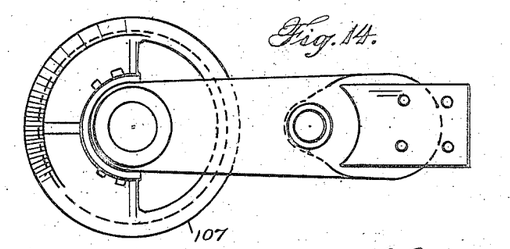
Fig. 14 is a plan view of the arm supporting the upper bearing for the main shaft.
Figure 15:
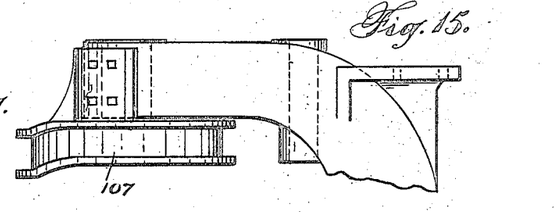
Fig. 15 is a side view of said arm and of the cam groove carried thereby.
Figure 16:
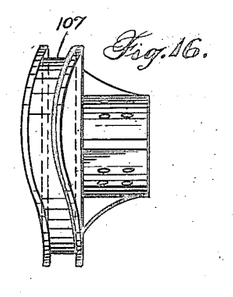
Fig. 16 is a side view of said cam groove looking in a direction at right angles to that of Fig. 15.
Figures 17, 18:
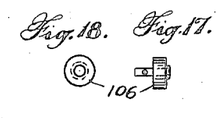
Fig. 17 is a front view and Fig. 18 is a side view of the roller operating in the cam groove shown in Fig. 15.

In the bearing 32 corresponding to each slide bearing 31, can turn a sleeve 51, in which can slide vertically, while keyed thereto, a shaft 52. A second shaft 53 can slide vertically in the other bearing 33. Said shafts 52, 53, also slide through an extension 54, over said bearings 32, 33, from the sleeve 31, (Fig. 12). Over said extension is a forked guide piece 55 for the cans, (Figs. 5, 6, 30) having apertures through which said shafts 52, 53, pass, and above said guide pieces 55 are fixed to the shafts 52, 53, two diverging jaws 56, (Figs. 3, 7) the function of which jaws is to closely surround the can body near the top, so that their upper surfaces form a pressure surface upon which to flange the upper edge of the can. Said jaws are geared together by intermeshing gear teeth 57, so that they turn in unison, but in opposite directions. The lower end of the sleeve 51 has secured thereto an arm 58 (Figs. 9, 10, 11, 30) carrying a roller 59 which runs in a cam groove 60 formed in a cam 61 secured to the lower bearing 2 formed on the top of the base 1. By the movement of said roller 59 in said cam groove 60 said jaws are opened and closed. They are open at the time when the can is moved toward the center of the machine, so that said can can freely pass between said jaws. In so passing the can is guided into position by means of the forked guide piece 55. Immediately after so passing into position, the jaws close, owing to the roller 59 engaging an incline 64 in the cam groove, and the can is then firmly clamped between said jaws. While this is taking place the roller 48 secured upon the lower end of the sleeve 31 is rising upon the cam track 50 and is raising the can, and the jaws 56, into a position so that the upper edge of the can can be flanged by means of the flanger. This operation takes place while the can is traveling from the point of entry to the position marked a in Fig. 9.

Figure 37:
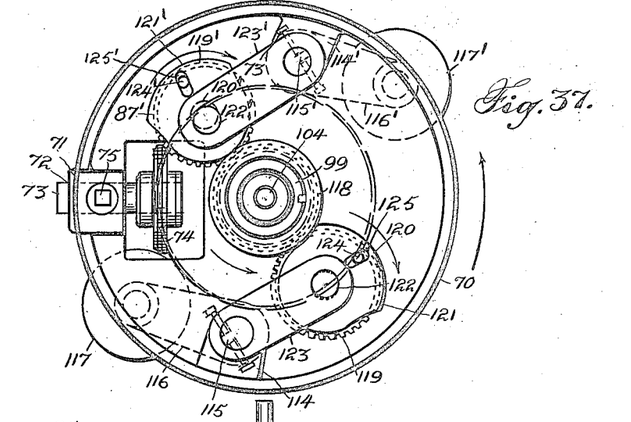
Fig. 37 is a plan view of the crimping head.
Figures 38, 39, 40, 41, 42:
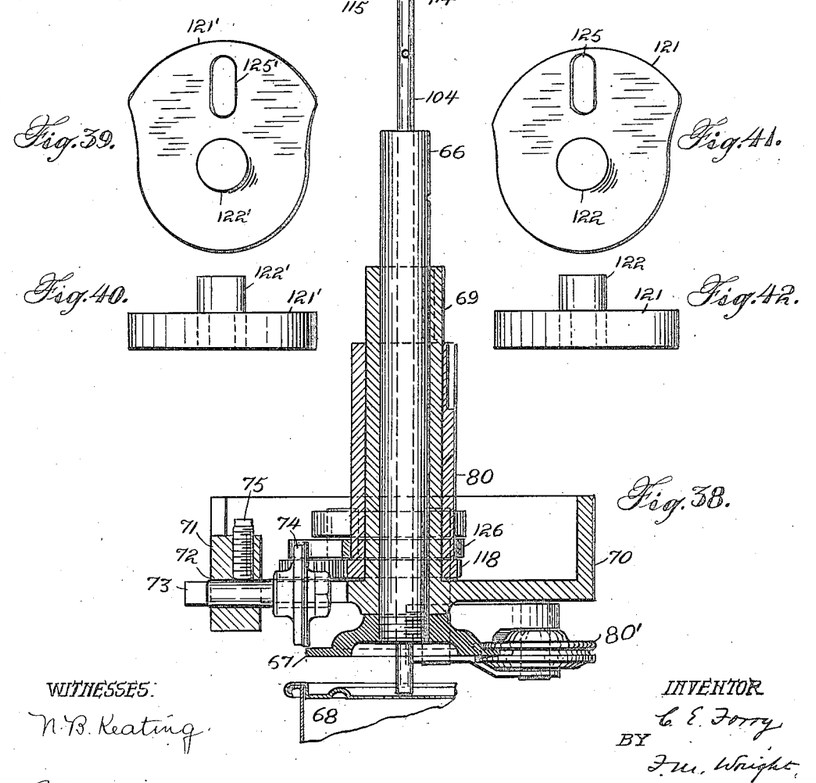
Fig. 38 is a vertical section of the same.
Fig. 39 is a plan view of one of the cams thereof.
Fig. 40 is a side view of the same.
Fig. 41 is a plan view of the other cam.
Fig. 42 is a side view of said cam.

Within each bearing 23 carried by the upper spider is secured by a pin 65, a tube or chuck support 66, (Figs. 2, 24), to the lower end of which is secured a chuck 67 which is adapted to enter the recess in the top 68, (Fig. 38) of the can when double seaming the can. Around said tube 66 rotates a sleeve 69, (Figs. 37, 38) formed at its lower end with a head 70, having a block 71 in which is formed a circular radial bearing 72. In said bearing is carried a stem 73 upon which a flanging roller 74 is mounted eccentrically so that said roller can be adjusted by turning the stem in its bearing, it being then secured therein by a set screw 75. While the can is traveling from the point of entry to the position marked a in Fig. 9, the roller 48 secured to the sleeve 31 and running upon the cam track 50, raises the can body 8 and jaws 56, and the edge of the can body thus rises up against said flanging roller 74 and is bent outward and flanged. At this time the crimping rollers 117, 117', hereinafter more particularly described, are in their outermost positions, so that they do not engage the can or can top. In the position in which the can is ready for flanging, it is at a slightly lower level than in the position which it assumes when ready for double seaming, and therefore the double seaming roller does not come in contact with the can top while in the former position. The rise of the cam track 50 whereby the flanging of the can body is effected is gradual up to the point marked *a* in Fig. 9, whereupon the can body and jaws 56 quickly drop to the lowest level, at which level they can pass under a guideway by which the tops are fed to the cans. Said sleeve 69 at its upper end carries a pinion 76 driven by a gear wheel 77 (Figs. 1, 2, 22, 23), keyed to the sleeve 10 which revolves about the shaft 11 and carries, above the upper bearing 7, the gear wheel 12 driven in the manner already described. The ratio of the teeth of the gear wheel 12 to the gear 13 is 10 to 6, while that of the gear wheel 22 to the pinion 21 is 10 to 1, the effect of which is that the gear wheel 12, and consequently the gear wheel 77, makes six revolutions to one revolution of the spider, that is, to one complete revolution of the can in its orbit. The diameter ratio of the gear wheel 77 to the pinion 76 is such that the inner sleeve 69 makes 20 rotations for one revolution of the can in its orbit around the shaft.

To the gear wheel 77 is secured a gear ring 78 beneath it, of slightly less diameter than the gear wheel 77, which meshes with a pinion 79 which is keyed to an outer sleeve 80, said pinion 79 being of greater diameter than the pinion 76, the effect of this being that, while the upper pinion 76 may make 20 revolutions to one complete revolution of the can in its orbit, the lower pinion 79 will make only 19 revolutions and will therefore produce a movement of said sleeve 80, relative to the inner sleeve 69, of one revolution for each complete revolution of a can carrier.

It is now necessary to secure to the can body either the bottom, if the can is empty, or the top if the can is filled. After being flanged the can and jaws 56 are moved down to a lower level by means of a cam 110, on the under side of which rides the cam roller 48. Said cam then positively forces the sleeve 31 downward in its bearing, and causes the can to descend to a position beneath the level of the can top guideway, the jaws 56 also descending with said sleeve. In their lowermost position they remain until such time as they are supplied with another can.

Figure 8:
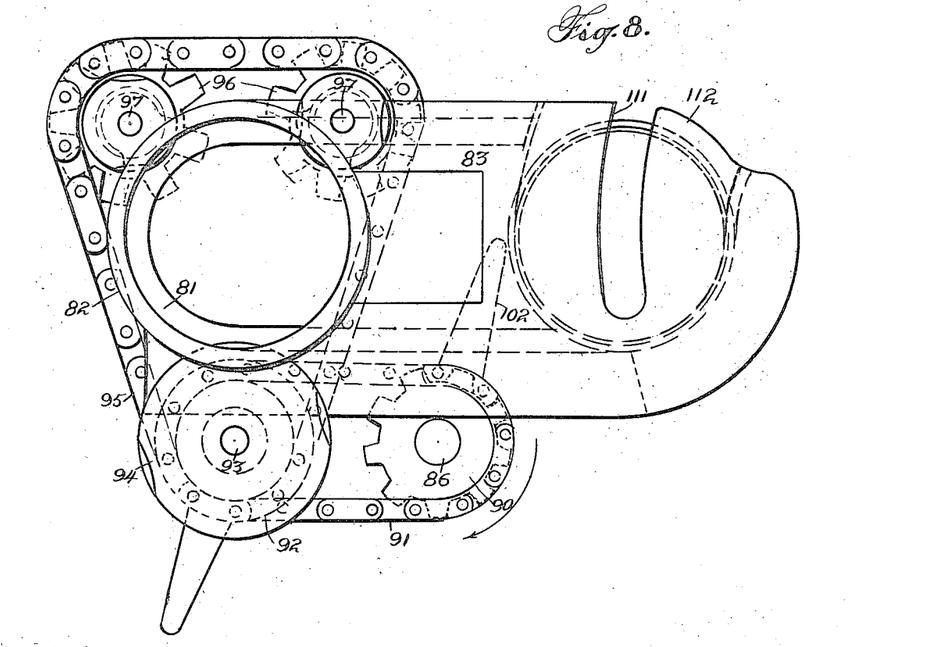
Fig. 8 is a plan view on an enlarged scale of the mechanism for feeding the can tops.
Figures 43, 44, 45:
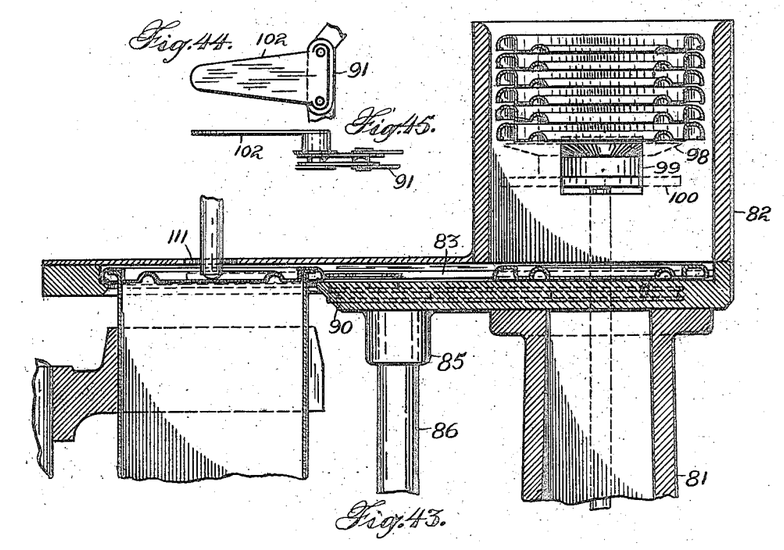
Fig. 43 is a sectional view of the mechanism for feeding the can tops.
Fig. 44 is a plan view of the finger of the feed chain.
Fig. 45 is a side view of the same.
Figure 46:
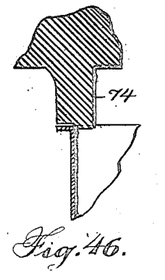
Fig. 46 is a vertical section of a portion of the can, illustrating the operation of flanging.

Mounted upon the base is a hollow standard 81, (Figs. 3, 8, 43,) upon the top of which is supported a cylindrical feed chamber or hopper 82 for the tops, said hopper having formed integral therewith at the bottom a guideway 83 for the can tops extending over the path of the cans. Mounted in bearings 84 and 85, in said base and extension, is a vertical shaft 86 which is driven by a sprocket wheel 87, sprocket chain 88 and sprocket wheel 89 from the shaft 11 at twice the speed of the latter. At its upper end said shaft 86 carries a sprocket wheel 90 which, by a sprocket chain 91 drives a sprocket wheel 92 upon a vertical shaft 93, upon which is also a sprocket wheel 94 around which travels a sprocket chain 95, which travels also around the idle sprocket wheels 96 upon vertical shafts 97. Upon each of the shafts 93 and 97 are secured three disks 98, 99, and 100 (Figs. 31–36,) those upon the shaft 93 being slightly larger than those upon the shaft 97, although of approximately the same form and similarly arranged. Each of the upper and lower disks 98, 100, is formed in its periphery with diametrically opposite concave notches or recesses 101 of such concavity that, when the notches of the corresponding disks of all three series are innermost, a can top can drop therebetween. The intermediate disks 99 have no notches and serve merely as spacing disks. Each of the upper disks has its periphery beveled or sharp from a point immediately behind each notch and gradually thickening to a point immediately in advance of the other notch, to enable it in its rotation, to easily pass between adjacent can tops. The periphery of the lower disk 100 is not beveled. A supply of can tops having been dropped into said hopper, and the shafts 93, 97, rotating, and all of said upper disks 98 having rotated to such a position that a concave notch 101 in each is at the part of the disk nearest to the vertical axial line through the can tops, then, owing to the relative dimensions of the disks and the can tops, the can tops can drop, the lowermost can top dropping through said notches, but being immediately arrested by the lowermost series of disks 100, which at that time are not in such a position that their notches face inwardly. As the disks rotate, the edges of the uppermost disks 98 adjacent to the concave notches pass underneath the can top next above the lowest, and slightly raise the same out of contact with the lowest can top. In the continued movement of the sprocket chain 95, the lowermost disks are now moved into such a position that their notches all face inwardly, permitting the lowermost can top to drop therethrough, but, at that time, the uppermost disks 98 have rotated to such a position that the notches therein no longer face inwardly, and the supply of can tops rests upon said uppermost disks. The operation is then repeated for the next lowest top, and so for each in succession. Since each of the upper and lower disks has two notches, it results that two can tops drop for each complete rotation of the shaft 86, and therefore four can tops for each complete rotation of the main shaft 11, this arrangement being necessary by reason of the fact that the machine is constructed with four can carriers. The lowermost top, having dropped from the hopper to the guideway 83, is now engaged by one of the fingers 102 (Figs. 8, 44, 45) carried on the sprocket chain 91 and is pushed along said guideway into a position over the path of the can up to the chuck preparatory to forming the operation of the crimping which will now be explained.

Figure 47:
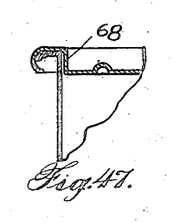
Fig. 47 is a similar view, showing a top in position on a can.
Figure 48:
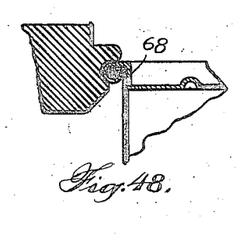
Fig. 48 is a similar view showing the operation of spinning.
Figure 49:
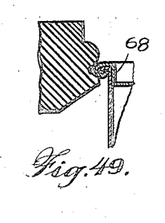
Fig. 49 is a similar view showing the operation of crimping.

Within the tube 66 can slide a long stem or pin 104 (Figs. 2, 21, 30, 38) which has at the top an inwardly or laterally extending arm 105 carrying a roller 106 which travels in a cam groove 107 secured upon the arm 6. At the point to which the can has been described as now arriving, the can body is again raised by reason of a cam roller 108 carried on the lower end of the plunger 9 riding up an incline of a cam track 109. The effect of this is to raise the can body up within the flange of the top, while at the same time the lower end of the stem 104 impinges upon the middle of the can top. The can body and can top are thereby clamped between the chuck 45 on the plunger 9 and said stem 104, and are carried with the spider, the lower end of the stem traveling in an open ended slot 111 formed in the cover of the guideway 112. The can body and can top travel horizontally until the latter has completely cleared the guideway, and then, by suitable inclines in these cams, the plunger 39 and stem 104 rise simultaneously, permitting the can body and can top rise up to the crimping device which will now be explained. In the head 70 formed on the lower end of said sleeve 69 are formed vertical pivot bearings 114, 114′, (Fig. 37), in which are pivoted vertical shafts 115, 115′, to the lower ends of which are secured arms 116, 116′, which carry at their outer ends crimping rollers 117, 117′. These shafts are rocked to move the crimping rollers to and from the work in the following manner. On the lower end of the sleeve 80, which surrounds the sleeve 69, are formed gear teeth 118, the teeth of which mesh with gear wheels 119, 119′, pivoted upon stud shafts 120, 120′, extending upward from the base of the head 70; and upon said gear wheels 119, 119′ are supported cams 121, 121′ having upstanding studs 122, 122′, carried by arms 123, 123′, secured to the vertical shafts 115, 115′. From said gear wheels 119, 119′ extend upwardly pins 124, 124′ which engage radial slots 125, 125′ in said cams, thereby causing the cams to rotate with the gear wheels. The cams engage a circular disk 126 around the sleeve 80, and the operation is therefore as follows:—As said sleeve 80 rotates, and with it the gear wheel 118 at its lower end, the gear wheels 119, 119′ are also rotated, thereby rotating the cams. The cams in their rotation engaging the circular disk 126, produce by the inclines thereon a rocking movement of the shafts 115, 115′, and move the rollers to and from their work. The arrangement of these cams is such that, of the two crimping rollers 117, 117′, the crimping roller 117 is used for spinning the edge of the can top to bend it over the flange of the can body as shown in Fig. 47, and the roller 117′ is used for finally crimping the same as shown in Figs. 48 and 49. The cams 121, 121′ are suitably formed and arranged with reference to the disk 126 to accomplish this result. The can is now lowered by reason of the roller 48 traveling beneath a cam 128. Immediately before the lowering of the can the jaws 56 begin to open by reason of the roller 59 traveling in the cam groove 60. While this is taking place the can has impinged against a deflecting bar 129, which diverts the can from its circular path, so that said can propelled by the succeeding cans, is guided by said deflecting bar to a position over the endless belt 34 and delivery guideway 130.

I claim:—

1. In an apparatus of the character described, the combination of a rotary shaft, a plurality of vertical slide bearings carried by said shaft, sleeves slidable in said bearings, plungers slidable vertically in said sleeves and arranged to support the can bodies, and independent cams for sliding said sleeves and plungers, substantially as described.

2. In an apparatus of the character described, the combination of a rotary shaft, a plurality of slide bearings carried by said shaft, plungers therein arranged to support can bodies, a pair of bearings between each slide bearing and the shaft, diverging jaws arranged to closely surround the can body near the top, shafts for said jaws having a rotary movement, and slidable in said second named bearings, and means for rotating said shafts in unison, substantially as described.

3. In an apparatus of the character described, the combination of a rotary shaft, a plurality of slide bearings carried by said shaft, plungers therein arranged to support can bodies, a pair of bearings between each slide bearing and the shaft, diverging jaws arranged to closely surround the can body near the top, shafts for said jaws having a rotary movement, and slidable in said second named bearings, gear teeth meshing with each other and operatively connected with said shafts whereby they rotate in unison, and a cam for rotating one of said shafts, substantially as described.

4. In an apparatus of the character described, the combination of a rotary shaft, a slide bearing carried thereby, a plunger slidable therein, and arranged to carry a can body, a pair of bearings also carried by said shaft, a pair of jaws and shafts for said jaws, said shafts having intermeshing gear teeth so that they turn in unison in opposite directions, a sleeve in one of said second named bearings in which one of said shafts can slide while keyed thereto, the other shaft being slidable in the other bearing, an arm carried by said sleeve, a roller carried by said arm, and a cam for actuating said roller, substantially as described.

5. The combination of a rotary shaft, a carrier for a can body, a pair of jaws arranged to clamp a can on said carrier, means for moving the jaws in unison in opposite directions to clamp the can and form a pressure surface upon which to flange the upper edge of the can, and means for flanging said upper edge upon said pressure surface, substantially as described.

6. In an apparatus of the character described, the combination of a rotary shaft, a spider connected thereto, and having a plurality of slide bearings, a sleeve slidable vertically in each bearing, said sleeve having an extension, a plunger slidable vertically in each sleeve, a disk supported upon said plunger for supporting the can body, a cam roller carried by said plunger, a cam arranged to actuate said roller to raise the plungers, an arm extending laterally from said sleeve, a cam roller carried thereby, a cam for moving said roller vertically, said spider having also a corresponding series of pairs of bearings, a sleeve rotatable in one of said second named bearings, a shaft slidable vertically in said latter sleeve, a shaft also slidable vertically in the other bearing, said latter shafts passing through said extension, a guide carried by said latter shafts, and jaws secured to said latter shafts arranged to clamp the can body, substantially as described.

7. In an apparatus of the character described, the combination of a rotary shaft, a spider connected thereto, and having a plurality of slide bearings, a sleeve slidable vertically in each slide, a plunger slidable vertically in each sleeve, a disk supported upon said plunger for supporting the can body, a cam roller carried by said plunger, a cam arranged to actuate said roller to raise the plunger, an arm extending laterally from said sleeve, a cam roller carried thereby, a cam for moving said roller vertically, said spider having also a corresponding series of pairs of bearings, a sleeve rotatable in one of said second named bearings, a shaft slidable vertically in said latter sleeve, a shaft also slidable vertically in the other bearing, said latter shafts sliding through said extension, a guide carried by said latter shafts, jaws secured to said latter shafts arranged to clamp the can body, means whereby said latter shafts rotate in unison, an arm on said last recited sleeve, a roller carried by said arm, and a cam arranged to actuate said roller to turn the sleeve, substantially as described.

8. The combination of a rotary shaft, a lower spider having a plurality of slide bearings, slidable devices in said bearings arranged to support can bodies, means for moving said devices vertically in said bearings, an upper spider carried by said shaft, having a corresponding plurality of slide bearings, a chuck support, in each of said bearings, a chuck supported on the lower end of said support and adapted to enter the recess in a can top, a sleeve around said chuck support, means for preventing the vertical movement of said sleeve on said chuck support, and a flanging roller fixedly supported by said sleeve, and double seaming rollers movably supported thereon, substantially as described.

9. In an apparatus of the character described, the combination of a feed chamber for can tops, a plurality of shafts adjacent to said chamber, means whereby said shafts may be caused to rotate in unison, and disks on each shaft, each disk having a notch or concavity in its edge, the disks projecting into the feed chamber and of such dimensions that, when corresponding disks on the shafts are turned so that the notches therein are in the said chamber, a can top can fall therebetween, the notches of the upper disks being angularly arranged differently from those of the lower disks, substantially as described.

10. In an apparatus of the character described, the combination of a feed chamber for can tops, a plurality of vertical shafts arranged adjacent to said chamber, three disks on each shaft, the middle disk on each shaft being a spacing disk and without notches, and the upper and lower disks on each shaft being formed with notches, means whereby said shafts are rotated so that notches on the uppermost disks are in position nearest to the center of the said chamber while those of the lowermost disks are in a different position, and whereby those of the lower disks are simultaneously in the position nearest to the center of the said chamber while those of the upper disks are in a different position, substantially as described.

11. In an apparatus of the character described, the combination of a feed chamber for can tops, a plurality of shafts adjacent to said chamber, means whereby said shafts may be caused to rotate in unison, disks on each shaft, each disk having a notch or concavity in its edge, the disks projecting into the feed chamber and of such dimensions that, when corresponding disks on the shafts are turned so that the notches therein are in the said chamber, a can top can fall therebetween, the notches of the upper disks being angularly arranged differently from those of the lower disks, a guideway for can tops, fingers for pushing the can tops along the guideway and means for moving the fingers in unison with the shafts.

12. In an apparatus of the character described, the combination of a rotary shaft, a plurality of carriers carried thereby, plungers in said carriers arranged to support can bodies, a plurality of upper bearings carried by said shaft, tubes in said bearings, inner and outer sleeves on said tubes, means for rotating said sleeves on said tubes, at different velocities, and crimping devices carried by one of said sleeves, and actuated by the rotation, relatively thereto, of the other sleeve, substantially as described.

13. In an apparatus of the character described, the combination of a rotary shaft, a plurality of carriers carried thereby, plungers in said carriers arranged to support can bodies, a plurality of upper bearings carried by said shaft, tubes in said bearings, inner and outer sleeves on said tubes, means for rotating said sleeves on said tubes at different velocities, crimping rollers, levers carried by one of said sleeves and carrying said rollers, cams for actuating said levers, and a disk on the other sleeve engaging said cams to actuate said rollers, substantially as described.

14. The combination with a holder for a stack of can heads, of a pair of rotary star shaped feeders each comprising two sets of supporting points alternately arranged and separated from each other the thickness of a can head, substantially as specified.

15. In combination, a chuck, a device to which said chuck is secured, a seaming head rotatable about said device, an arm movably mounted upon said seaming head, a vertical shaft carried by said arm, and a seaming roller on said shaft, a horizontal shaft adjustable longitudinally in a bearing therefor in said head, and a flange roller on said horizontal shaft, the lower portion of the edge of said flanging roller lying above and closely adjacent to the upper edge of the chuck.

In testimony whereof I have hereunto set my hand in the presence of two subscribing witnesses.

CHARLES E. FORRY.

Witnesses:
FRANCIS M. WRIGHT,
D. B. RICHARDS.